US012225336B1

(12) United States Patent
Geng et al.

(10) Patent No.: US 12,225,336 B1
(45) Date of Patent: Feb. 11, 2025

(54) SYSTEMS AND METHODS TO SECURE FABRIC TO SPEAKER-BASED DEVICES

(71) Applicant: Amazon Technologies, Inc., Seattle, WA (US)

(72) Inventors: Xuan Geng, Sunnyvale, CA (US); Susan Swindlehurst, Morgan Hill, CA (US); Wentao Cheng, Shenzhen (CN); Shankar Ganapathysubramanian, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 17/468,825

(22) Filed: Sep. 8, 2021

(51) Int. Cl.
*H04R 1/02* (2006.01)
*B32B 3/26* (2006.01)
*B32B 5/02* (2006.01)
*B32B 7/12* (2006.01)

(52) U.S. Cl.
CPC .............. *H04R 1/023* (2013.01); *B32B 3/266* (2013.01); *B32B 5/022* (2013.01); *B32B 7/12* (2013.01); *B32B 2250/02* (2013.01); *B32B 2457/00* (2013.01); *H04R 2201/029* (2013.01); *H04R 2410/00* (2013.01)

(58) Field of Classification Search
CPC .............. H04R 1/023; H04R 2201/029; H04R 2410/00; H04R 1/02; B32B 3/266; B32B 5/022; B32B 7/12; B32B 2250/02; B32B 2457/00; B32B 7/14; C09J 7/00
USPC ............................................. 381/189; 181/199
See application file for complete search history.

(56) References Cited

U.S. PATENT DOCUMENTS

| | | | |
|---|---|---|---|
| 9,930,444 B1* | 3/2018 | Stanley | H05K 1/0274 |
| 10,557,221 B1* | 2/2020 | Sprague | D03D 1/00 |
| 11,134,323 B2* | 9/2021 | Mietta | H04R 1/025 |
| 2020/0208311 A1* | 7/2020 | Bowles | D04B 1/18 |

FOREIGN PATENT DOCUMENTS

JP 59125198 A * 7/1984 ............. H04R 1/023

OTHER PUBLICATIONS

Machine Translation of JP59125198 (Year: 1982).*

* cited by examiner

*Primary Examiner* — Forrest M Phillips
*Assistant Examiner* — Jennifer B. Olson
(74) *Attorney, Agent, or Firm* — Eversheds Sutherland (US) LLP

(57) ABSTRACT

Systems and methods are disclosed for securing fabric to speaker-based devices. An example device may include a housing having a first portion devoid of apertures, and a second portion having a first number of apertures. The device may include a fabric disposed about the housing, and an adhesive disposed between the fabric and the housing. The adhesive may include a first portion disposed between a first portion of the fabric and the first portion of the housing, and a second portion disposed between a second portion of the fabric and the second portion of the housing. The first portion of the adhesive may have a patterned non-liquid material that is bonded, and the second portion of the adhesive may have the patterned non-liquid material that is unbonded.

18 Claims, 6 Drawing Sheets

SYSTEMS AND METHODS TO SECURE FABRIC TO SPEAKER-BASED DEVICES

BACKGROUND

Electronic devices may include speakers to present audio to users. In some instances, electronic devices may be covered with fabrics or other covers. For example, users may personalize devices using fabrics or other covers to make the device aesthetically pleasing and/or to resemble furniture or art pieces. However, such covers may impact audio performance of speakers due to blockage and other factors. Moreover, adhesives or other materials used to secure fabrics to devices may contribute to blockage or may otherwise interfere with audio performance of speakers. Accordingly, systems and methods to secure fabric to speaker-based devices may be desired.

Figure 1:
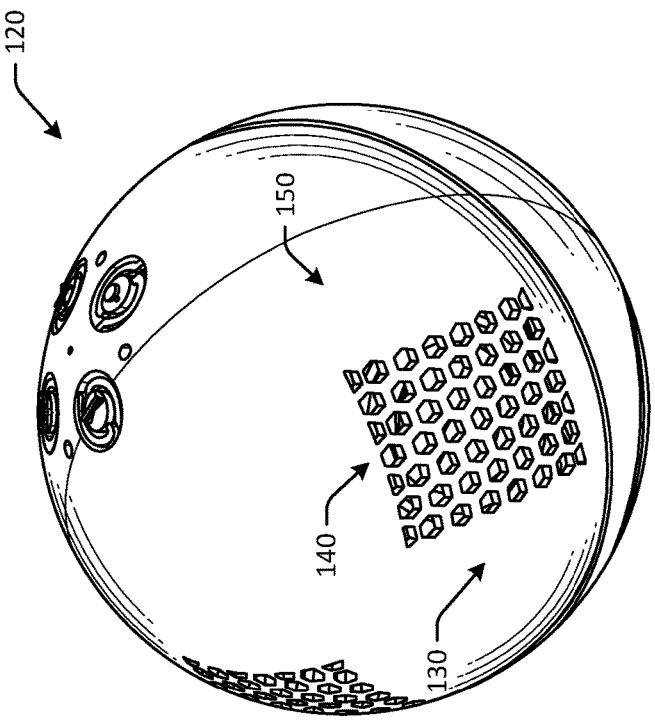
FIG. 1 is a schematic drawing of an example use case of an electronic device having a fabric secured using a non-liquid adhesive in accordance with one or more embodiments of the disclosure.
Figure 1:
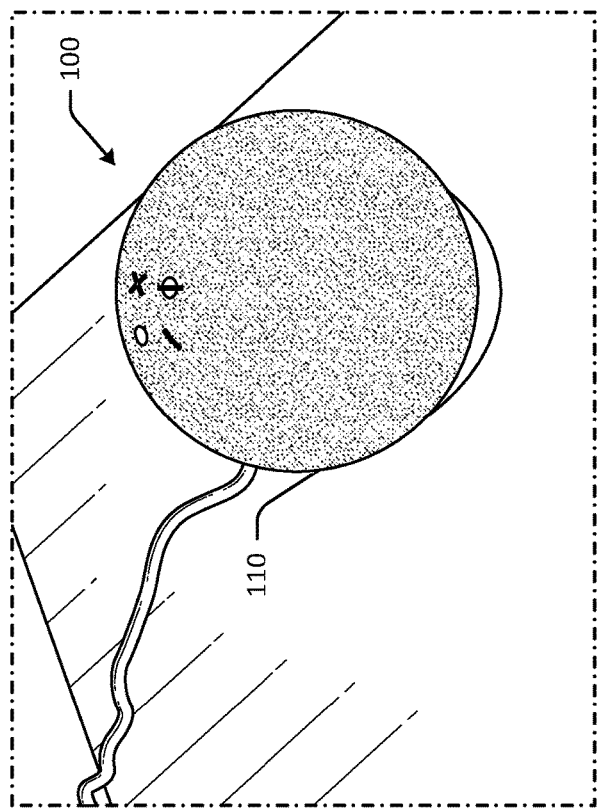
Figure 1:
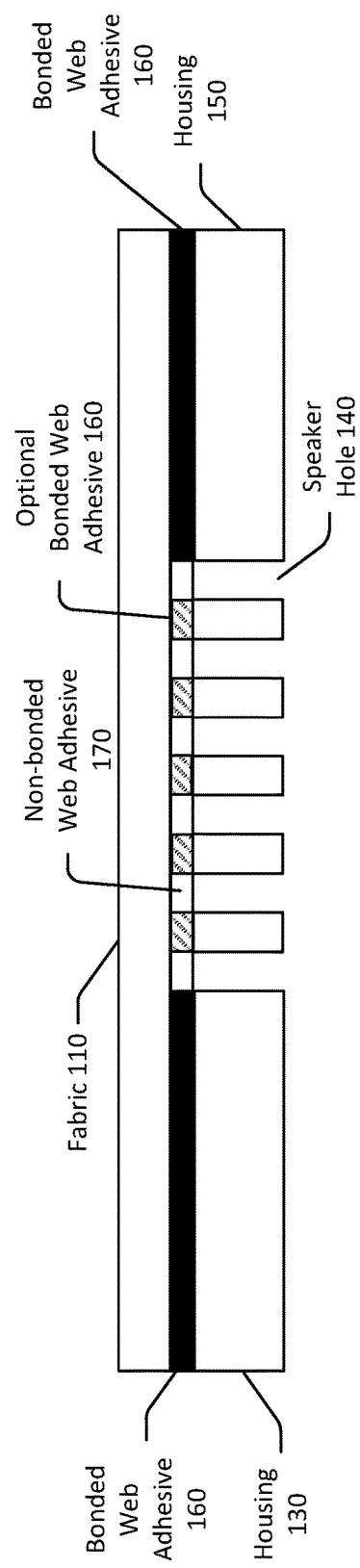

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Electronic devices may be used to present audio content using one or more speakers. For example, speaker-based devices include portable speakers, voice-assistant devices that interact with users via voice input and audible feedback, and the like. Users may enjoy wrapping speaker-based devices with fabrics to improve aesthetic appearance and/or to customize their devices. However, audio performance of such speaker-based devices may be impacted when the device is wrapped in fabric, as the sound output from the speaker(s) can be obstructed. In particular, depending on the method used to secure the fabric to the device, the amount of impact can vary.

For instance, if a sprayed glue is used to secure the fabric to the device housing, the sprayed glue may obstruct speaker holes or apertures of the device, thereby obstructing sound output and degrading audio performance. In addition, sprayed glues and other adhesives can have high material loss (e.g., over 70%, etc.), resulting in negative environmental impact, higher production costs due to materials, and added complexity during manufacture due to overspray cleaning, etc. The wasted material may be unusable.

Embodiments of the disclosure include systems and methods for securing fabric to speaker-based devices without the use of sprayed adhesives. Some embodiments include web adhesives formed of, in some embodiments, patterned non-liquid adhesive materials that can be selectively activated or bonded, to secure fabric to devices without obstructing speaker apertures. Some embodiments also simplify the manufacturing process by reducing the number of steps needed to secure the fabric to the device, reducing the precision needed to secure the fabric to the device, and/or reducing the complexity of material handling by using a substrate or film instead of a spray. Certain embodiments may eliminate the need for operations such as glue mixing, baking after spraying, overspray cleaning, waste disposal, etc. associated with sprayed adhesives.

Referring to FIG. 1, an example use case of an electronic device 100 having a fabric secured using a web adhesive in accordance with one or more embodiments of the disclosure. In FIG. 1, the electronic device 100 may be a voice-assistant device, a speaker device, or other type of electronic device configured to output sound. The electronic device 100 may have a fabric cover 110 disposed about some or all of a housing of the electronic device 100. The housing may be spherical, as depicted in FIG. 1, or may be cylindrical, rectangular, triangular, or have a different geometry or shape in other embodiments. In some embodiments, the electronic device 100 may include one or more microphones to detect voice input. The electronic device 100 may include one or more speakers disposed in the housing and oriented to direct sound output towards one or more speaker holes formed in the housing.

The electronic device 100 is depicted with the fabric cover 110 removed in perspective view 120. The housing of the electronic device 100 may include one or more apertures, such as speaker apertures through which sound output from one or more speakers disposed inside the electronic device 100 is directed. The housing of the electronic device 100 may include portions that are devoid of apertures, such as a first portion 130 devoid of apertures, and a third portion 150 devoid of apertures. The housing may include a second portion 140 having one or more apertures, such as a first plurality of apertures or speaker holes. The second portion 140 may be disposed between the first portion 130 and the third portion 150.

The portions of the housing of the electronic device 100 that are devoid of apertures may be used to secure the fabric cover 110 to the electronic device 100 via activation of a web adhesive material corresponding to those portions. Activation of the adhesive material, which may be a patterned non-liquid material, may result in formation of a bond between the adhesive and an adjacent component, such as the fabric cover 110 on one side and the housing on the other side. The portions of the web adhesive material corresponding to the portion of the housing having speaker holes, such as the second portion 140, may not be activated, so as to avoid obstructing the speaker holes and impacting sound or audio performance. Inactivated portions of the adhesive material, such as the patterned non-liquid material, may be non-bonded or unbonded to adjacent components.

As depicted in the cross-sectional view of the electronic device 100 in FIG. 1, the fabric cover 110 may be secured to the device housing using a web adhesive, where only portions of the web adhesive are bonded. The web adhesive may be a nonwoven web material formed of a non-liquid adhesive that may be patterned in some embodiments. For some adhesive materials, bonding or activation of the web adhesive indicates that the adhesive material was subject to heat and pressure for a dwell time long enough to melt or soften the adhesive. As the adhesive material cools, the adhesive may change from a non-bonded state to a bonded state. Other portions of the web adhesive may remain inactivated or non-bonded, such as the portions adjacent to speaker apertures, so as to avoid melting and runoff of adhesive material into the speaker apertures and/or to otherwise prevent obstruction of the speaker holes and negatively impact audio performance. For example, in FIG. 1, bonded portions 160 of the web adhesive are represented as black portions and are located in areas where the housing is devoid of apertures. Non-bonded portions 170 of the web adhesive are located in areas where speaker holes or other apertures are present. The portions of the web adhesive between adjacent speaker holes 140 may be optionally bonded, as pressure and heat can be applied to these regions if desired, but may not be necessary to secure the fabric cover 110 to the electronic device 100. Other embodiments may change the adhesive from a non-bonded state to a bonded state via infrared heat application, ultrasonic application, and so forth depending on a type of adhesive used.

For example, the fabric cover 110 may include a first fabric portion covering the first portion 130 of the housing, a second fabric portion covering the second portion 140 of the housing, and a third fabric portion covering the third portion 150 of the housing. The web adhesive, which may be a thermosetting adhesive, a thermoplastic adhesive, etc. may be disposed between the fabric cover 110 and the housing. The web adhesive may include a first web portion disposed between the fabric cover 110 and the first portion 130 of the housing, a second web portion disposed between the fabric cover 110 and the second portion 140 of the housing. The first web portion may be bonded, and the second web portion may remain non-bonded, as discussed in detail with respect to FIG. 2. For example, the first web portion may have bonded patterned non-liquid adhesive, and the second web portion may have non-bonded patterned non-liquid adhesive.

Example embodiments of the disclosure provide a number of technical features or technical effects. For example, in accordance with example embodiments of the disclosure, certain embodiments of the disclosure may provide systems and methods to secure fabric to electronic devices without negatively impacting sound or audio performance. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

ILLUSTRATIVE EMBODIMENTS AND USE CASES

Figure 2:
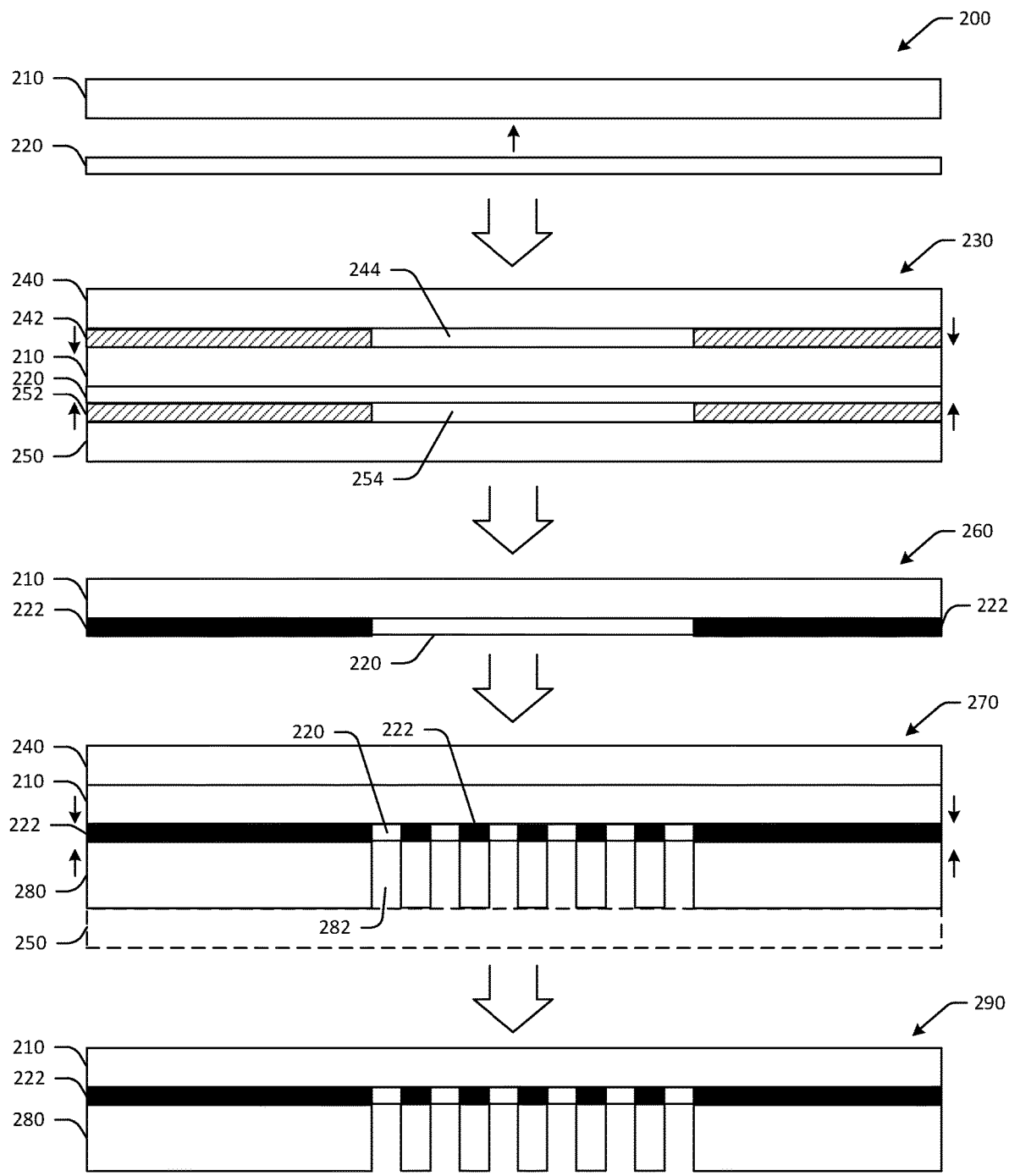
FIG. 2 is a schematic drawing in cross-sectional view of an example process flow for securing fabric to an electronic device using a non-liquid adhesive in accordance with one or more embodiments of the disclosure.

FIG. 2 is a schematic drawing in cross-sectional view of an example process flow for securing fabric to an electronic device using a web adhesive in accordance with one or more embodiments of the disclosure. Other embodiments may include additional or fewer components and/or operations. The illustrations of FIG. 2 are for illustrative purposes only and are provided only as an example.

In FIG. 2, a process of securing fabric to an electronic device, such as a speaker device, a voice-assistant device, etc., is depicted in cross-sectional view. At a first operation 200, a fabric 210 may be provided, along with a web adhesive material 220. The fabric 210 may be any suitable fabric material and color. For example, the fabric 210 may be a cloth fabric, a synthetic fabric, a composite fabric, or a different type of fabric. The fabric 210 may be formed of fibers, which may include natural fibers, such as wool or cotton, synthetic fibers, such as nylon, polyester, or plastic, cellulose fibers, acrylic fibers, metal fibers, or any other suitable type of fiber.

The web adhesive material 220 may be formed of a continuous or discrete patterned non-liquid adhesive. The continuous or discrete pattern of web adhesive material 220 may be formed by various methods, such as melt blowing, die cutting, roller coating, and the like. The web adhesive material 220 may therefore have a web pattern in some embodiments. Melt blown adhesives may have random patterns of apertures formed therein, whereas other adhesives, such as die cut adhesives, may have uniform patterns of apertures formed therein. The web adhesive material 220 may be a nonwoven and porous material, and can vary in thickness. In some embodiments, the web adhesive material 220 may be thinner than the fabric 210. The web adhesive material 220 may be formed of various materials, such as polyester, polyamide, polyurethane, and other materials. In some embodiments, the web adhesive material 220 may be a solid adhesive film that is porous, so as to maintain breathability and flexibility. The web adhesive material 220 may have a number of apertures that are formed by design or that may occur randomly. For example, melt blown, roller coating, die cutting, etc. can produce web adhesives with different opening patterns. The opening or aperture patterns may affect acoustic performance. The apertures of the web adhesive material 220 may not have to be aligned with speaker apertures of a device. The web adhesive material 220 may be formed of an adhesive material that is tack-free (e.g., in a solid state) at room temperature until bonded by a heat source. In some embodiments, the adhesive material may be a thermoplastic adhesive that are brought to a liquid state by applying heat, and then may become a solid again as the adhesive cools and a bond is formed.

At a second operation 230, the fabric 210 may be coupled to the web adhesive material 220. The second operation 230 may be a lamination or pre-tacking operation, and may be optional in some embodiments. To couple the fabric 210 to the web adhesive material 220, heat and pressure may be applied for a certain length of time (e.g., a dwell time, etc.).

A hot press 240 may be used to apply heat to the fabric 210 and the web adhesive material 220. The hot press 240 may be separated from the fabric 210 by one or more separator components 242, such as silicone pads. The separator components 242 may be used to apply pressure to certain portions of the fabric 210 and/or certain portions of the web adhesive material 220. Together, the fabric and the adhesive may form a permeable substrate.

A support 250 may be disposed on the web adhesive material 220 side of the structure. The support 250 may be separated from the web adhesive material 220 by one or more separator components 252, which may also be silicone pads. Together, the heat press 240 and the support 250 may apply heat and pressure to portions of the fabric and web adhesive material 220, where the pressure is only applied to portions in contact with the respective separator components 242, 252. The heat and pressure may cause activation of certain portions of the web adhesive material 220. As a result of the selective application of pressure, certain portions of the web adhesive material 220 may not be bonded, or may remain non-bonded or unbonded. For example, the separator components 242 may have a gap 244 therebetween where no pressure is applied, and as a result, the corresponding portion of the web adhesive material 220 may not be bonded due to the lack of pressure. Similarly, the separator components 252 may have a gap 254 therebetween where no pressure is applied, and as a result, the corresponding portion of the web adhesive material 220 may not be bonded due to the lack of pressure. In some embodiments, the web adhesive material 220 may be formed of a patterned non-liquid adhesive having a melting temperature greater than or equal to 150 degrees fahrenheit. In some embodiments, the adhesive may have a softening temperature, as opposed to a melting temperature, of equal to or greater than 100 degrees fahrenheit.

At a third operation 260, the heat and pressure may be removed after a dwell time has elapsed, where the dwell time may depend on the types of materials used for the fabric 210 and the web adhesive material 220, the thickness of the fabric 210 and the web adhesive material 220, the amount of heat and pressure applied, and so forth. Once completed, the fabric 210 and the web adhesive material 220 may be bonded or otherwise coupled together and may form a substrate. Bonded portions 222 of the web adhesive material 220 are depicted as black portions in FIG. 2, and non-bonded portions of the web adhesive material 220 are represented as white portions. The fabric 210 and the web adhesive material 220 may together form a permeable substrate. The fabric 210 and the web adhesive material 220 may be configured to be laser cut or otherwise trimmed as a singular piece.

At a fourth operation 270, the fabric 210 and the web adhesive material 220 may be arranged about a device housing 280. The device housing 280 may include one or more speaker apertures 282. The hot press 240 and the support 250 (or different hot presses and supports) may be used to secure the fabric 210 to the device housing 280. The hot press 240 may be used with or without the separator components 242. The support 250 may be used with or without the separator components 252. The hot press 240 may be used in conjunction with the support 250 to apply pressure and heat to the fabric 210, the web adhesive material 220, and the device housing 280. The pressure and heat may be applied for a dwell time that may be longer than the dwell time during the second operation 230. The pressure and heat may cause the web adhesive material 220 to melt and, as it cools, to bond the fabric 210 to the device housing 280. Because there is no pressure applied to the speaker apertures 282, the portions of the web adhesive material 220 above the speaker apertures 282 may remain non-bonded, whereas the portions between the speaker apertures 282 may become bonded portions 222. For example, a first web portion of the web adhesive material 220, which may be a nonwoven web material, may be adhered to a first fabric portion of the fabric, and to a first portion of the device housing 280. A second web portion of the web adhesive material 220 may be adhered or bonded to a second fabric portion of the fabric, but may not be adhered or bonded to the device housing 280 due to the presence of a speaker aperture 282. In some embodiments, the second web portion of the web adhesive material 220 may not be adhered to either the fabric or the device housing 280 due to the presence of a speaker aperture 282 (e.g., in instances where there is no pre-tacking or lamination of the web adhesive material 220 to the fabric 210, etc.).

At a fifth operation 290, the heat press 240 may be removed after the dwell time is complete, and the web adhesive material 220 may cool. As the web adhesive material 220 cools, the fabric 210 may be secured to the device housing 280 via the bonded portions 222 of the web adhesive material 220.

Figure 3:
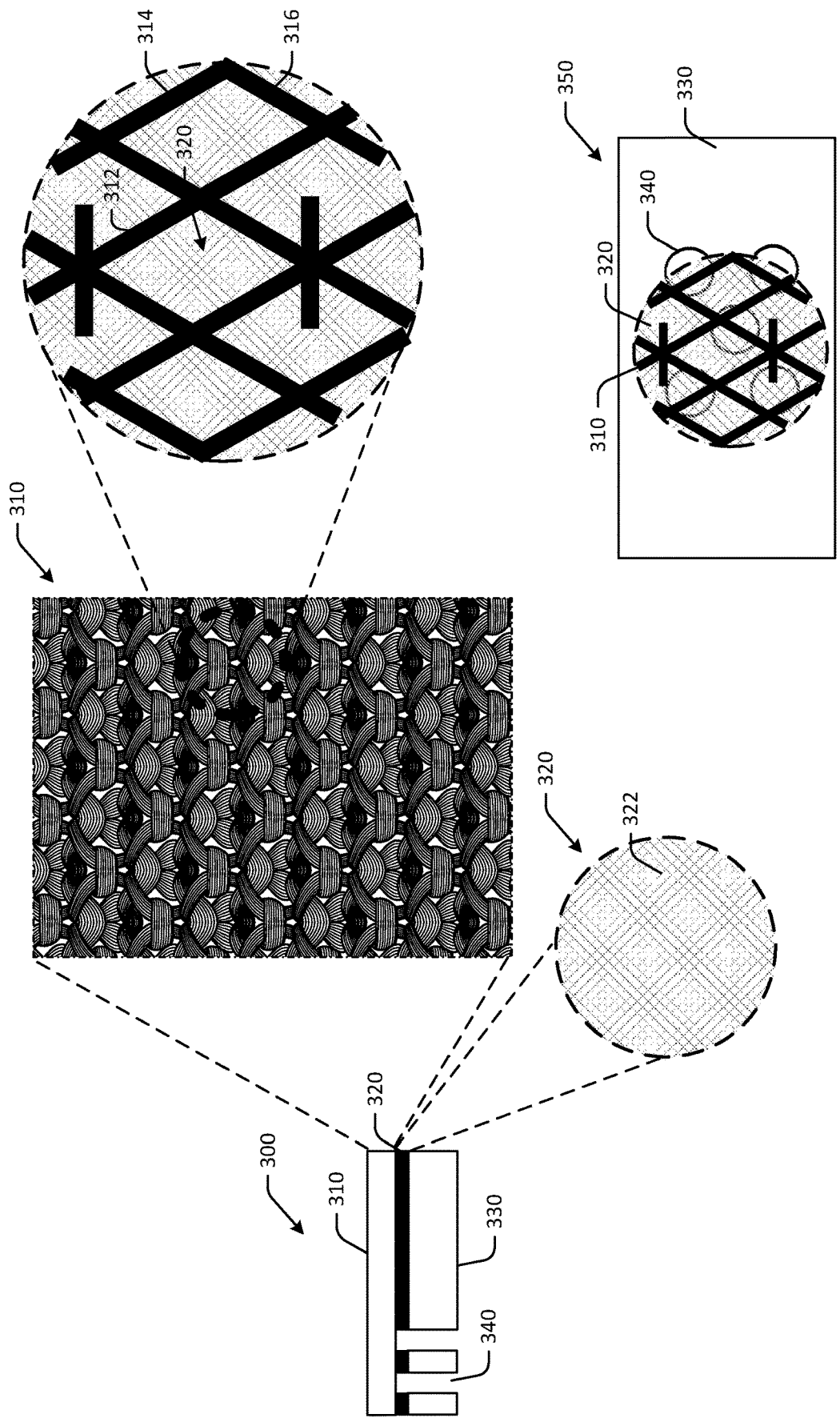
FIG. 3 is a schematic drawing of a portion of a device coupled to a fabric using a non-liquid adhesive in cross-sectional and top views in accordance with one or more embodiments of the disclosure.

FIG. 3 is a schematic drawing of a portion of a device 300 coupled to a fabric using a web adhesive in cross-sectional and top views in accordance with one or more embodiments of the disclosure. Other embodiments may include additional or fewer components. The illustrations of FIG. 3 are for illustrative purposes only and are provided only as an example implementation.

In FIG. 3, the device 300 may include a fabric cover layer 310, a web adhesive material layer 320, and a housing 330, as depicted in cross-sectional view. Each of the layers may include one or more apertures. However, none of the apertures of the respective layers may need to be aligned with each other to avoid impacting audio performance of the device 300. For example, the different apertures may be partially overlapping or not overlapping at all, but the audio performance may not be meaningfully impacted due to the avoidance of activation of the web adhesive material layer 320 at speaker apertures 340 formed in the housing 330.

For example, the fabric cover layer 310 is depicted in a top view as a knit material. Any suitable material may be used for the fabric cover layer 310, including synthetic materials, cloth materials, yarn materials, and/or other materials. In a detail view of the fabric cover layer 310 in FIG. 3, the fabric cover layer 310 may include a first yarn segment 312, a second yarn segment 314, and a third yarn segment 316. The respective first yarn segment 312, second yarn segment 314, and third yarn segment 316 may be knitted to form the fabric cover layer 310. The fabric cover layer 310 may include apertures formed between the different yarn segments, such as between the first yarn segment 312 and the second yarn segment 314, and so forth. The web adhesive material layer 320 may be visible through the apertures in the fabric cover layer 310, as illustrated in the detail view.

The web adhesive material layer 320 may include apertures 322 that may be formed as a result of the formation process of the web adhesive material layer 320. For example, a melt blown web adhesive material layer 320 may have randomly formed apertures or openings, whereas a die cut web adhesive material layer 320 may have a specific pattern with apertures having a specific type of geometry or pattern. The apertures 322 of the web adhesive material layer 320 may not be aligned with the apertures of the fabric cover layer 310. When non-bonded, the web adhesive material layer 320 may retain apertures 322, thereby allowing sound waves to pass through unimpeded. In bonded portions of the web adhesive material layer 320, the apertures may be removed due to the melting and cooling of the adhesive.

The device 300 may include the speaker apertures 340 formed in the housing 330, through which sound output from one or more speakers may pass, such that the sound is audible outside the device 300. As depicted in a top view 350 of a portion of the device 300, the fabric cover layer 310 and the web adhesive material layer 320 may be coupled to the housing 330 of the device 300. Neither the apertures of the fabric cover layer 310 nor the apertures 322 of the web adhesive material layer 320 may need to be aligned with the speaker apertures 340, as depicted in FIG. 3. This may simplify the manufacturing process by reducing the amount of precision needed to secure the fabric to the device, and may also result in overall improved audio quality by reducing the potential for obstruction to sound output via the speaker apertures 340.

Accordingly, in some embodiments, the device 300 may include a first plurality of apertures, such as the speaker apertures 340, and the web adhesive material layer 320 may include a second plurality of apertures, such as apertures 322, that is not aligned with the first plurality of apertures of the device 300. The fabric cover layer 310 may include a third plurality of apertures that is not aligned with the second plurality of apertures of the web adhesive material layer 320 and/or the first plurality of apertures of the device 300.

Figure 4:
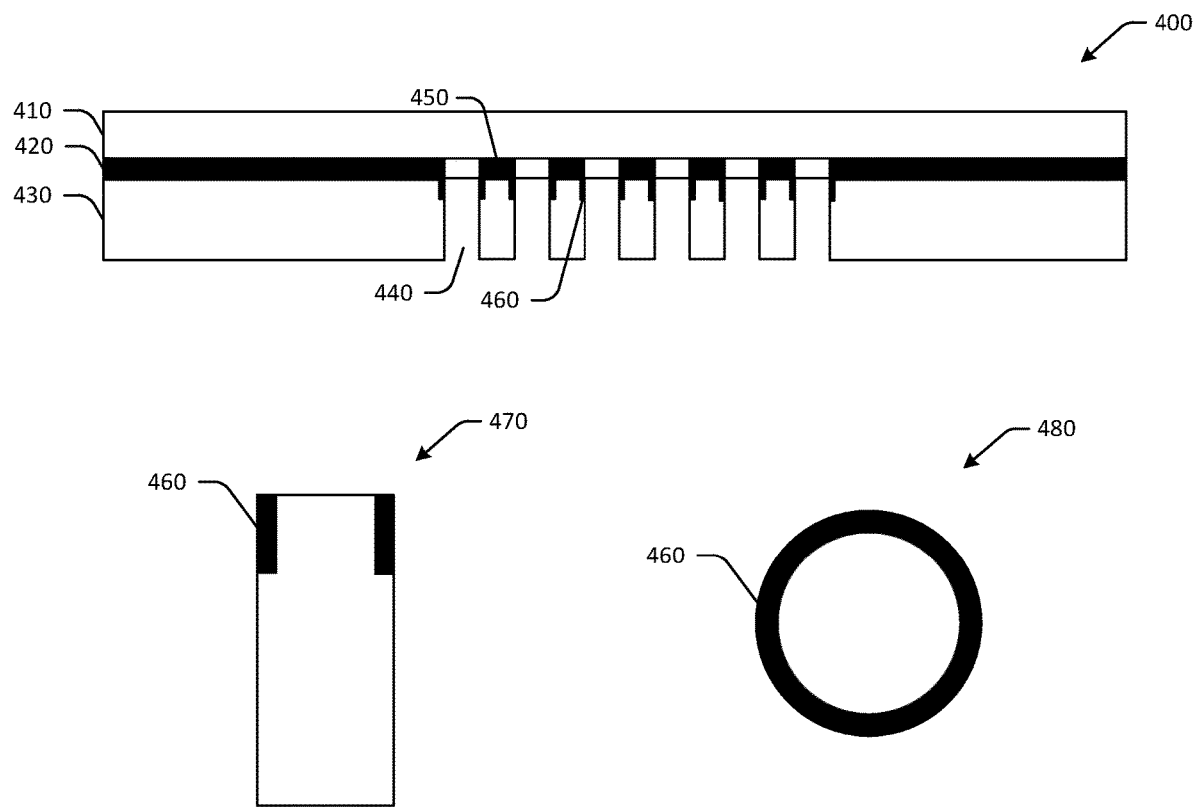
FIG. 4 is a schematic drawing of a cross-sectional view of a portion of a device with overflow grooves coupled to a fabric using a non-liquid adhesive in accordance with one or more embodiments of the disclosure.

FIG. 4 is a schematic drawing of a cross-sectional view of a portion of a device with overflow grooves coupled to a fabric using a web adhesive in accordance with one or more embodiments of the disclosure. Other embodiments may include additional or fewer components. The illustrations of FIG. 4 are for illustrative purposes only and are provided only as an example implementation.

In FIG. 4, a portion of a device 400 is depicted in cross-sectional and top views. The device 400 may include a fabric cover 410, a web adhesive 420 formed of a patterned non-liquid material, and a device housing 430. The device housing 430 may include a number of apertures 440, such as speaker apertures to allow sound from one or more speakers disposed in the device housing to output sound that is audible outside the device 400.

The web adhesive 420 may be bonded at certain regions, so as to avoid obstructing or blocking the apertures 440 of the device housing 430. Bonded portions of the web adhesive 420 are represented as black portions in FIG. 4, and include bonded portions 450 between adjacent apertures 440. Non-bonded portions of the web adhesive 420 are represented as white portions in FIG. 4.

During the activation process for the web adhesive 420, a small amount of runoff may occur, where melted web adhesive material flows into the apertures 440. To prevent the runoff from obstructing or negatively impacting speaker performance, some embodiments may include one or more grooves 460 formed about the apertures 440. The grooves 440 may have a geometry that corresponds to the apertures 440. For example, the circular apertures in the example of FIG. 4 may have corresponding circular grooves. The grooves 460 are depicted in isolated view 470 and top view 480 in FIG. 4.

The grooves 460 provide a space for any potential runoff to flow into, thereby preventing the runoff from moving further into the device housing and/or blocking the apertures 440.

In the example of FIG. 4, the device 400 may include a first plurality of apertures that includes a first aperture, such as the aperture 440. The device housing 430 may include the groove 460 formed about the first aperture, where the groove may include runoff patterned non-liquid adhesive material from a portion of the web adhesive. Once the patterned non-liquid material cools, the patterned non-liquid material may be secured in the groove 460. The groove 460 may therefore include a melted (and then cooled) portion of the bonded patterned non-liquid material from the web adhesive.

Figure 5:
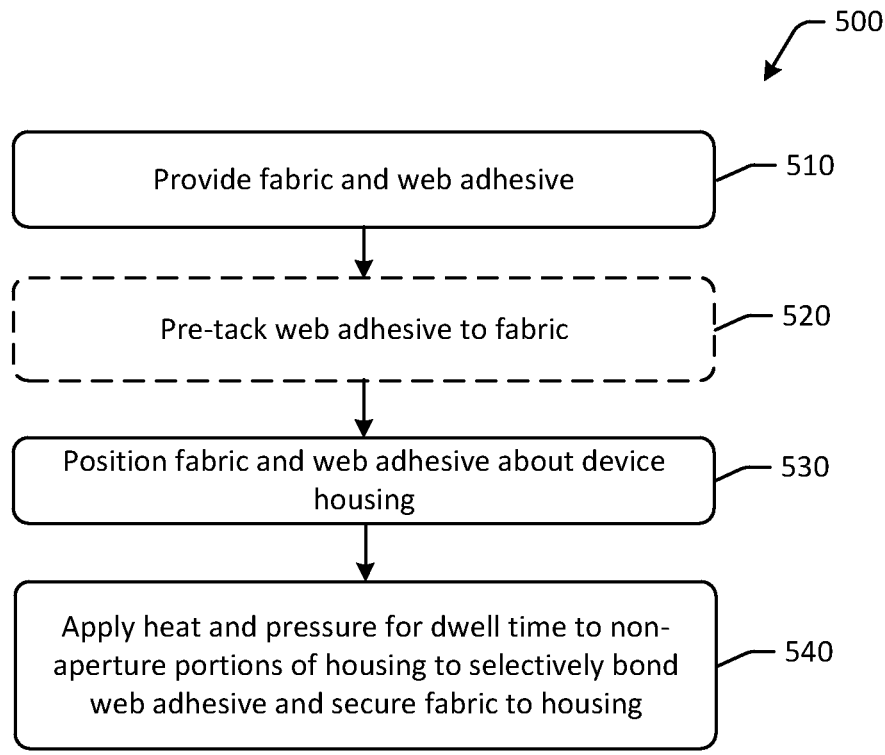
FIG. 5 is a schematic drawing of an example method of manufacture for securing fabric to speaker-based devices in accordance with one or more embodiments of the disclosure.

FIG. 5 is a schematic drawing of an example method of manufacture for securing fabric to speaker-based devices in accordance with one or more embodiments of the disclosure. One or more of the operations of FIG. 5 may be performed at least partially concurrently in some embodiments. One or more of the operations of the process flow 500 may be optional and may be performed in any order or at least partially concurrently in some embodiments.

In FIG. 5, a process flow 500 includes a number of operations that can be completed to secure a fabric cover to a device using a web adhesive. In some implementations, the process may include pre-tacking or laminating a web adhesive material to a fabric prior to coupling the fabric to the device. In other implementations, pressure and/or heat may be selectively applied to activate portions of the web adhesive material to secure the fabric to the device, and pre-tacking or lamination may not be needed.

At a first block 510 of the process flow 500, a fabric and a web adhesive may be provided. The fabric may be any suitable fabric that is to be used to cover at least a portion of a device. The fabric may have apertures formed naturally in the fabric, such as apertures due to weaving, knitting, or other formation of the fabric. The web adhesive may be a nonwoven material and may be formed at least partially of patterned non-liquid material. In some instances, the web adhesive may be formed using a melt blowing process, a die cutting process, a roller coating process, or another suitable process. The web adhesive may also have apertures formed therein.

At optional block 520 of the process flow 500, the web adhesive may be pre-tacked to the fabric. Pre-tacking may be used to laminate the web adhesive to the fabric. Pre-tacking may be performed using lower temperatures and/or lower pressure than a temperature or pressure used to fully activate the patterned non-liquid adhesive that forms the web adhesive. Lamination or pre-tacking of the fabric and web adhesive may result in a combined substrate that can be handled as a single component. The pre-tacking process may be for certain portions of the web adhesive and fabric, and not for the entire fabric and web adhesive. Some embodiments may not laminate or pre-tack the web adhesive to the fabric. Accordingly, some embodiments may use pre-lamination or pre-tacking to couple the web adhesive to the fabric at a lower temperature of heat and/or for a shorter dwell time than the dwell time of block 540. Heat-activated bonding may be used to bond the pre-tacked fabric to the device housing at a relatively higher temperature for a longer dwell time. In one embodiment, the web adhesive is formed of a patterned non-liquid adhesive having a melting temperature greater than or equal to 150 degrees fahrenheit.

At block 530 of the process flow 500, the fabric and the web adhesive may be positioned about a device housing. The fabric and web adhesive may be positioned independently in instances where the fabric and web adhesive are not pre-tacked or laminated. In some embodiments, the device housing may be cylindrical or spherical, and the fabric and web adhesive may be disposed about the cylindrical or spherical portion of the device housing.

At block 540 of the process flow 500, heat and pressure may be applied for a certain dwell time to the non-aperture portions of the housing to selectively bond the web adhesive and secure the fabric to the device housing. The temperature of the heat, the amount of pressure, and/or the length of dwell time may vary depending on the type of patterned non-liquid adhesive and/or the type of web adhesive used, along with other factors, such as the thickness of the fabric, the thickness of the web adhesive, the thickness of the device housing, and/or other factors. The heat and pressure may be applied for a longer dwell time than heat and pressure is applied during the optional pre-tacking process. The pressure may be applied selectively by using silicone pads or other materials as described with respect to FIG. 2, using specially formed molds, or using other forms of targeted pressure application. In some embodiments, heat may be applied to aperture portions of the device housing, but because there is no pressure applied to those portions, the corresponding portions of web adhesive will not be bonded.

The fabric and the web adhesive together may form a permeable substrate that allows sound waves, air, etc. to pass therethrough. The fabric and the web adhesive may be configured to be laser cut or otherwise trimmed after coupling to the device housing.

In some embodiments, the portions of the web adhesive disposed above speaker apertures in the device housing may not have adhered to the fabric or the device housing. In other embodiments, the portions of the web adhesive disposed above speaker apertures in the device housing may have adhered to the fabric and not to the device housing.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 6:
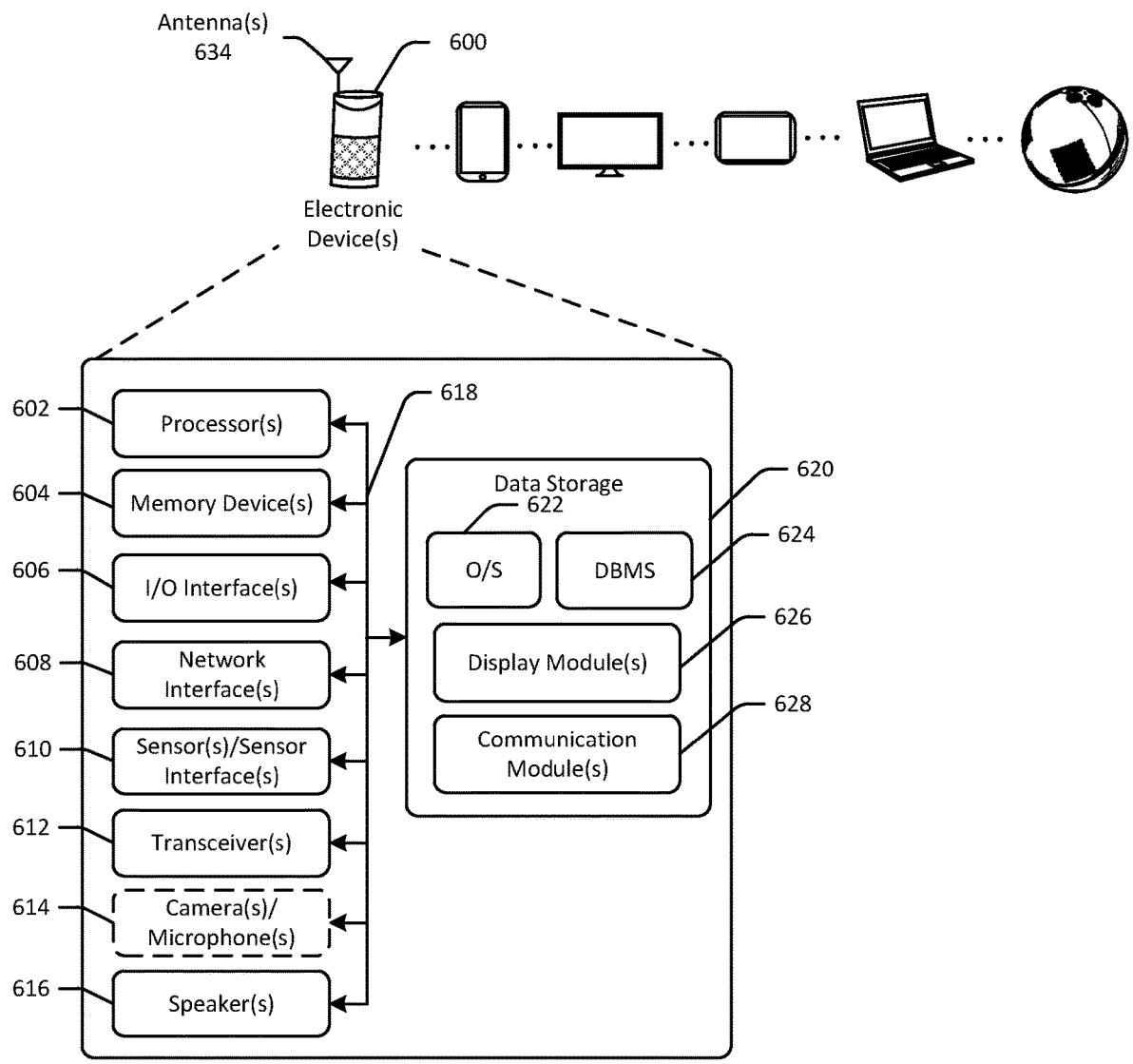
FIG. 6 schematically illustrates example architecture of a device in accordance with one or more embodiments of the disclosure.

FIG. 6 is a schematic block diagram of one or more illustrative electronic device(s) 600 in accordance with one or more example embodiments of the disclosure. The electronic device(s) 600 may include any suitable computing device including, but not limited to, a server system, a mobile device such as a smartphone, a tablet, an e-reader, a wearable device (e.g., augmented reality glasses, virtual reality glasses, etc.), or the like; a desktop computer; a laptop computer; a content streaming device; a set-top box; a scanning device; or the like. The electronic device(s) 600 may correspond to an illustrative device configuration for the device(s) of FIGS. 1-5.

The electronic device(s) 600 may be a speaker device, and may include one or more microphones for voice-assistant functionality. The electronic device(s) 600 may be configured to communicate with one or more servers, user devices, or the like. The electronic device(s) 600 may be any suitable device, such as a mobile device, and may optionally be configured to determine voice commands, determine wake-word utterances, determine and/or control other devices, and other operations. The electronic device(s) 600 may be configured to present content, detect sound, output digital content, and/or other functionality. In some embodiments, a single remote server or a single group of remote servers may be configured to perform more than one type of functionality in conjunction with an electronic device.

The electronic device(s) 600 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 600 may include one or more processors (processor(s)) 602, one or more memory devices 604 (also referred to herein as memory 604), one or more input/output (I/O) interface(s) 606, one or more network interface(s) 608, one or more sensor(s) or sensor interface(s) 610, one or more transceiver(s) 612, one or more optional camera(s) and/or microphone(s) 614, one or more speaker(s) 616, and data storage 620. The electronic device(s) 600 may further include one or more bus(es) 618 that functionally couple various components of the electronic device(s) 600. The electronic device(s) 600 may further include one or more antenna(s) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit the exchange of information (e.g., data (including computer-executable code), signaling, etc.) between various components of the electronic device(s) 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 604 of the electronic device(s) 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to the memory 604 for use by the processor(s) 602 during the execution of the computer-executable instructions. Moreover, output data generated as a result of execution of the computer-executable instructions by the processor(s) 602 may be stored initially in the memory 604, and may ultimately be copied to the data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more display module(s) 626, one or more communication module(s) 628, and/or other module(s). Some or all of these module(s) may be sub-module(s). Any of the components depicted as being stored in the data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in the data storage 620 may support functionality described in reference to corresponding components named earlier in this disclosure.

The data storage 620 may further store various types of data utilized by the components of the electronic device(s) 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, an example datastore(s) may include, for example, user preference data and/or other information.

The processor(s) 602 may be configured to access the memory 604 and execute the computer-executable instructions loaded therein. For example, the processor(s) 602 may be configured to execute the computer-executable instructions of the various program module(s), applications, engines, or the like of the electronic device(s) 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the display module(s) 626 may include computer-executable instructions, code, or the like that responsive to execution by one or more of the processor(s) 602 may perform functions including, but not limited to, requesting and/or receiving software updates, generating user interfaces, controller projector operation, causing display of content, generating instructions for individual modules, generating sequences of operations, providing a plug-n-play user interface, and the like.

The communication module(s) 628 may include computer-executable instructions, code, or the like that are responsive to execution by one or more of the processor(s) 602 may perform functions including, but not limited to, sending and/or receiving data, including content, sending and/or receiving instructions and commands, and the like.

Referring now to other illustrative components depicted as being stored in the data storage 620, the O/S 622 may be loaded from the data storage 620 into the memory 604 and may provide an interface between other application software executing on the electronic device(s) 600 and the hardware resources of the electronic device(s) 600. More specifically, the O/S 622 may include a set of computer-executable instructions for managing the hardware resources of the electronic device(s) 600 and for providing common services to other application programs (e.g., managing memory allocation among various application programs). In certain example embodiments, the O/S 622 may control the execution of the other program module(s). The O/S 622 may include any operating system now known or which may be developed in the future, including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 600 is a mobile device, the DBMS 624 may be any suitable lightweight DBMS optimized for performance on a mobile device.

Referring now to other illustrative components of the electronic device(s) 600, the input/output (I/O) interface(s) 606 may facilitate the receipt of input information by the electronic device(s) 600 from one or more I/O devices as well as the output of information from the electronic device(s) 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The electronic device(s) 600 may further include one or more network interface(s) 608 via which the electronic device(s) 600 may communicate with any of a variety of other systems, platforms, networks, devices, and so forth. The network interface(s) 608 may enable communication, for example, with one or more wireless routers, one or more host servers, one or more web servers, and the like via one or more networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the electronic device(s) 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the electronic device(s) 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The camera(s) 614 may be any device configured to capture ambient light or images. The microphone(s) 614 may be any device configured to receive analog sound input or voice data. The speaker(s) 616 may be any suitable speaker and may be in various form factors, configurations, and sizes.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the electronic device(s) 600 may include alternate and/or additional hardware, software, or firmware components beyond those described or depicted without departing from the scope of the disclosure. More particularly, it should be appreciated that software, firmware, or hardware components depicted as forming part of the electronic device(s) 600 are merely illustrative and that some components may not be present or additional components may be provided in various embodiments. While various illustrative program module(s) have been depicted and described as software module(s) stored in the data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software components without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machines, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A voice-assistant device comprising:
a microphone;
a housing comprising:
   a first housing portion devoid of apertures; and
   a second housing portion comprising a plurality of apertures, the second housing portion disposed adjacent to the first housing portion, wherein the plurality of apertures comprises a first plurality of first apertures, wherein the second housing portion further comprises a groove formed about each of the first apertures;
a speaker disposed inside the housing and arranged such that sound output from the speaker is directed towards the plurality of apertures;
a fabric comprising:
   a first portion disposed over the first housing portion; and
   a second portion disposed over the second housing portion; and
a nonwoven material disposed between the fabric and the housing, the nonwoven material comprising:
   a third portion disposed between the first portion and the first housing portion; and
   a fourth portion disposed between the second portion and the second housing portion; and
   a fifth portion disposed about each groove, and wherein the fifth portion being bonded, patterned, and non-liquid;
   wherein the third portion comprises a patterned non-liquid adhesive that is bonded to the first portion, and the fourth portion comprises the patterned non-liquid adhesive that is unbonded to the second portion.

2. The voice-assistant device of claim 1, wherein the fourth portion of the nonwoven material is bonded to the second portion of the fabric.

3. The voice-assistant device of claim 1, wherein the second portion of the fabric comprises a first plurality of apertures, and the fourth portion of the nonwoven material comprises a second plurality of apertures;
 wherein the first plurality of apertures and the second plurality of apertures are not aligned; and
 wherein the second plurality of apertures is not aligned with the plurality of apertures of the second housing portion.

4. A device comprising:
 a housing comprising a first portion devoid of apertures, and a second portion having a first plurality of apertures;
 a fabric disposed about the housing; and
 an adhesive disposed between the fabric and the housing, the adhesive comprising a first portion disposed between a first portion of the fabric and the first portion of the housing, and a second portion disposed between a second portion of the fabric and the second portion of the housing;
 wherein the first portion of the adhesive comprises a patterned non-liquid material that is bonded, and the second portion of the adhesive comprises the patterned non-liquid material that is unbonded;
 wherein the first plurality of apertures comprises a second plurality of first apertures, wherein the housing further comprises a groove formed about each of the first apertures, and wherein each groove comprises a third portion of the adhesive.

5. The device of claim 4, wherein the third portion is bonded, patterned, and non-liquid.

6. The device of claim 4, wherein the second portion of the adhesive is adhered to the fabric and is not adhered to the housing.

7. The device of claim 4, wherein the adhesive comprises a second plurality of apertures, and wherein a majority of the second plurality of apertures are not aligned with the first plurality of apertures.

8. The device of claim 7, wherein the fabric comprises a third plurality of apertures, and wherein a majority of the third plurality of apertures are not aligned with the second plurality of apertures.

9. The device of claim 4, wherein the fabric and the adhesive together form a permeable substrate.

10. The device of claim 4, wherein the adhesive has a softening temperature greater than or equal to 100 degrees fahrenheit.

11. The device of claim 4, wherein the adhesive is a melt blown, die cut, or roller coated patterned non-liquid material.

12. The device of claim 4, further comprising:
 a speaker disposed in the housing, wherein the speaker is oriented to direct sound towards the plurality of apertures.

13. The device of claim 4, further comprising:
 a microphone;
 wherein the housing is cylindrical, triangular, or spherical in shape.

14. A device comprising:
 a housing comprising a first portion and a second portion, the second portion having a first plurality of apertures, wherein the first plurality of apertures comprises a second plurality of first apertures, wherein the second portion of the housing further comprises a groove formed about each of the first apertures;
 a fabric disposed about the housing; and
 an adhesive disposed between the fabric and the housing, the adhesive comprising a first portion disposed between the fabric and the first portion of the housing, a second portion disposed between the fabric and the second portion of the housing, and a third portion disposed about each groove;
 wherein the first portion of the adhesive comprises a non-liquid material that is bonded, and the second portion of the adhesive comprises the non-liquid material that is unbonded.

15. The device of claim 14, wherein the adhesive has a web pattern.

16. The device of claim 14, wherein the second portion of the adhesive is bonded to the fabric and is not bonded to the housing.

17. The device of claim 14, wherein the adhesive comprises a second plurality of apertures that is not aligned with the first plurality of apertures; and
 wherein the fabric comprises a third plurality of apertures that is not aligned with the second plurality of apertures.

18. The device of claim 14, wherein the fabric and the adhesive together form a permeable substrate, the device further comprising:
 a speaker disposed in the housing.

\* \* \* \* \*